(12) United States Patent
Beck et al.

(10) Patent No.: US 11,244,780 B2
(45) Date of Patent: Feb. 8, 2022

(54) STORAGE CHOKE

(71) Applicants: TDK Electronics AG, Munich (DE);
Bayerische Motoren Werke Aktiengesellschaft

(72) Inventors: Fabian Beck, Rüttenen (CH); Florian Boehm, Ulm (DE); Matthias Koeppen, Heidenheim (DE); Manuel Raimann, Munich (DE)

(73) Assignees: BAYERISCHE MOTOREN WERKE AKTIENGESELLSCHAFT, Munich (DE); TDK ELECTRONICS AG, Munich (DE)

( * ) Notice: Subject to any disclaimer, the term of this patent is extended or adjusted under 35 U.S.C. 154(b) by 167 days.

(21) Appl. No.: 16/619,907

(22) PCT Filed: Jun. 25, 2018

(86) PCT No.: PCT/EP2018/066949
§ 371 (c)(1),
(2) Date: Dec. 5, 2019

(87) PCT Pub. No.: WO2019/007738
PCT Pub. Date: Jan. 10, 2019

(65) Prior Publication Data
US 2020/0227187 A1 Jul. 16, 2020

(30) Foreign Application Priority Data
Jul. 4, 2017 (DE) .......................... 102017114900.7

(51) Int. Cl.
*H01F 27/24* (2006.01)
*H01F 27/28* (2006.01)
(Continued)

(52) U.S. Cl.
CPC .............. *H01F 3/10* (2013.01); *H01F 27/24* (2013.01); *H01F 27/28* (2013.01);
(Continued)

(58) Field of Classification Search
CPC ........... H01F 27/24; H01F 27/28; H02M 1/26
(Continued)

(56) References Cited

U.S. PATENT DOCUMENTS 5,506,559 A * 4/1996 Yamaguchi ............. H01F 17/04
336/83
5,581,224 A 12/1996 Yamaguchi
(Continued)

FOREIGN PATENT DOCUMENTS

CN 202839232 U 3/2013
CN 104124040 A 10/2014
(Continued)

OTHER PUBLICATIONS

Czogalla, J., et al.,"Automotive Application of Multi-Phase Coupled-Inductor DC-DC Converter," IEEE Industry Applications Society Annual Meeting, Oct. 2003, 7 pages.
(Continued)

*Primary Examiner* — Gary A Nash
(74) *Attorney, Agent, or Firm* — Slater Matsil, LLP

(57) ABSTRACT

A storage choke is disclosed. In an embodiment a storage choke includes at least two coils and a core, wherein the core couples the coils to one another, and wherein the core comprises a first region comprising a first material and a second region comprising a second material that is different from the first material.

20 Claims, 4 Drawing Sheets

(51) Int. Cl.
*H02M 1/26* (2006.01)
*H01F 3/10* (2006.01)
*H01F 17/00* (2006.01)
*H02M 3/337* (2006.01)

(52) U.S. Cl.
CPC .................. *H01F 2003/106* (2013.01); *H01F 2017/0093* (2013.01); *H02M 1/26* (2013.01); *H02M 3/337* (2013.01)

(58) Field of Classification Search
USPC .................. 363/47, 106; 366/200, 212, 221; 336/200, 212, 221
See application file for complete search history.

(56) References Cited

U.S. PATENT DOCUMENTS

| | | | |
|---|---|---|---|
| 5,861,792 | A | 1/1999 | Ueda et al. |
| 6,617,814 | B1* | 9/2003 | Wu .................. H01F 37/00 318/448 |
| 6,980,077 | B1 | 12/2005 | Chandrasekaran et al. |
| 8,031,042 | B2* | 10/2011 | Silva .................. H01F 3/10 336/212 |
| 9,524,821 | B2 | 12/2016 | Yamamoto |
| 10,121,582 | B2 | 11/2018 | Zheng et al. |
| 10,153,022 | B1 | 12/2018 | Di Vincenzo |
| 10,170,231 | B2 | 1/2019 | Winkler et al. |
| 2004/0196125 | A1 | 10/2004 | Kubo |
| 2009/0212894 | A1* | 8/2009 | Hsieh .................. H01F 17/045 336/83 |
| 2012/0106210 | A1* | 5/2012 | Xu .................. H02M 1/126 363/37 |
| 2012/0249280 | A1* | 10/2012 | Nussbaum .......... H02M 3/1584 336/192 |
| 2013/0049918 | A1* | 2/2013 | Fu .................. H01F 3/12 336/220 |
| 2014/0132379 | A1 | 5/2014 | Vafakhah et al. |
| 2014/0320255 | A1 | 10/2014 | Liu et al. |
| 2016/0300657 | A1 | 10/2016 | Wu et al. |

FOREIGN PATENT DOCUMENTS

| | | |
|---|---|---|
| CN | 104715886 A | 6/2015 |
| DE | 102011055134 A1 | 11/2012 |
| DE | 102014206469 A1 | 10/2015 |
| DE | 112013006277 T5 | 10/2015 |
| DE | 102016201258 A1 | 8/2017 |
| EP | 2453450 A1 | 5/2012 |
| JP | H06005448 A | 1/1994 |
| JP | H80115831 A | 5/1996 |
| JP | 2001313221 A | 11/2001 |
| JP | 2004228270 A | 8/2004 |
| JP | 2006108573 A | 4/2006 |
| JP | 2008288441 A | 11/2008 |
| JP | 2013093921 A | 5/2013 |
| JP | 2013115298 A | 6/2013 |
| JP | 2013179259 A | 9/2013 |
| JP | 2013251451 A | 12/2013 |
| JP | 2014127637 A | 7/2014 |
| JP | 2020523725 A | 8/2020 |

OTHER PUBLICATIONS

Wikipedia, "Ferromagnetismus," https://de.wikipedia.org/wiki/Ferromagnetismus, Apr. 19, 2018, 19 pages.
Eth Zürich, "Power Electronics Concept for 50 kW," Power Electronic Systems Laboratory, pp. 172-182.

* cited by examiner

STORAGE CHOKE

This patent application is a national phase filing under section 371 of PCT/EP2018/066949, filed Jun. 25, 2018, which claims the priority of German patent application 102017114900.7, filed Jul. 4, 2017, each of which is incorporated herein by reference in its entirety.

TECHNICAL FIELD

The present invention relates to a storage choke for a polyphase DC/DC converter.

SUMMARY OF THE INVENTION

Embodiments provide an advantageous storage choke. For example, a common-mode inductance and a differential-mode inductance of the storage choke could be configured in such a way that the storage choke is suitable for use in a polyphase DC/DC converter.

According to an embodiment, a storage choke for a polyphase DC/DC converter is proposed, which comprises at least two coils and a core, by means of which the coils are coupled to one another, wherein the core comprises a first region, which comprises a first material, and a second region, which comprises a second material that is different to the first material.

The first region may preferably consist of the first material. The second region may preferably consist of the second material.

The use of a core which comprises two mutually different materials makes it possible to configure the core in such a way that it has a desired common-mode inductance and a desired differential-mode inductance. Accordingly, the use of a core which comprises two mutually different materials may allow a higher design freedom which makes it possible to optimize the common-mode inductance and the differential-mode inductance of the storage choke. In particular, the common-mode inductance and the differential-mode inductance may now be optimized separately from one another.

For the common-mode inductance, a magnetic flux may have a high DC component and only a low AC component. If the storage choke is used in a DC/DC converter, this magnetic flux is responsible for the majority of the overall magnetic flux. A material having a high saturation flux density should therefore be selected.

For the differential-mode inductance, a magnetic flux which has a high AC component is advantageous. A current which occurs because of the flux for the differential-mode inductance circulates at the input of the storage choke and leads only to reactive power. A differential-mode flux results from the driving of neighboring coils with a phase shift. However, the differential-mode flux ideally contains no DC component. A material having a lower saturation flux density but higher permeability may therefore be selected. The effect achievable in this way is that the differential-mode current ripple is as small as possible. Accordingly, the reactive power is low.

The first material may be configured and arranged in such a way that a certain common-mode inductance of the storage choke is achieved. The second material may be configured and arranged in such a way that a certain differential-mode inductance of the storage choke is achieved.

The first material may have a higher saturation magnetization than the second material. A saturation magnetization indicates a material-specific maximum value of the magnetization, which cannot be exceeded even by an increase in the external magnetic field strength. For the first material, a magnetic saturation may occur not until magnetic flux densities of more than 1 T.

The core may preferably be configured in such a way that a path determined for the common-mode inductance extends only through the first material. Because of its high saturation magnetization, the first material may allow a sufficiently high magnetic flux along the path determined for the common-mode inductance.

The first material may have a lower magnetic permeability than the second material. The magnetic permeability indicates the perviousness of a material for magnetic fields. A differential-mode path, along which the magnetic flux extends, which is advantageous for the differential-mode inductance, may be optimized by the second material having a higher magnetic permeability than the first material and a lower saturation magnetization than the first material. In the second region, the magnetic flux may have a strength for which the use of the second material having a high magnetic permeability is appropriate. The differential-mode flux, which is present in the second region of the core, ideally contains no DC component, and the overall flux density in the second region is therefore lower. Because of the higher magnetic permeability of the second material, a high value may result of the differential-mode inductance.

The first region may comprise rod-shaped cores and inner plates. Each coil may be wound around a rod-shaped core, the rod-shaped cores bearing on the inner plates. In particular, the first region may comprise two inner plates, the rod-shaped cores being arranged between the inner plates. In this case, the rod-shaped cores and the inner plates are advantageous for determining the common-mode inductance. The rod-shaped cores may have a symmetry axis and are arranged in such a way that the symmetry axis is perpendicular to the inner plates. The coils may enclose the symmetry axes of the rod-shaped cores.

The second region may comprise outer plates, which are arranged on the sides of the inner plates facing away from the rod-shaped cores and are arranged parallel to the inner plates. In particular, the second region may comprise two outer plates, which are respectively arranged parallel to an inner plate and are arranged on the side of the inner plates respectively facing away from the rod-shaped cores. The first region may in this case be arranged between the two outer plates.

The inner plates and the outer plates may be separated from one another by a gap.

The first region may comprise at least one core part, which is arranged between two coils in such a way that a first side surface of the at least one core part faces toward one of the two coils and a second side surface of the at least one core part faces toward another of the two coils. The at least one core part is in this case configured to carry magnetic fields generated by the coil.

The at least one core part may have a triangular cross section. Triangular cross sections are particularly advantageous since these are adapted very well to the round shape of the coils and may be arranged over a large region close to the coil.

The first region may comprise a plurality of such core parts, an opening respectively being arranged between the core parts. Accordingly, the individual core parts do not touch. Through the opening, a cooling system may straightforwardly access the coils. The core parts, which may contribute to carrying the magnetic fields, may accordingly be configured in such a way that they do not obstruct cooling of the coils.

The first material may be a compressed powder, in particular a compressed iron powder core. The second material may be a sintered material. It may, for example, be a manganese-zinc ferrite. These materials have the advantageous properties described above. It is, however, also possible to use other materials for the first material and/or the second material.

Embodiments provide a polyphase DC/DC converter, which comprises the storage choke described above.

BRIEF DESCRIPTION OF THE DRAWINGS

Embodiments or the present invention will be described in more detail below with the aid of the following figures.

DETAILED DESCRIPTION OF ILLUSTRATIVE EMBODIMENTS

Figure 1:
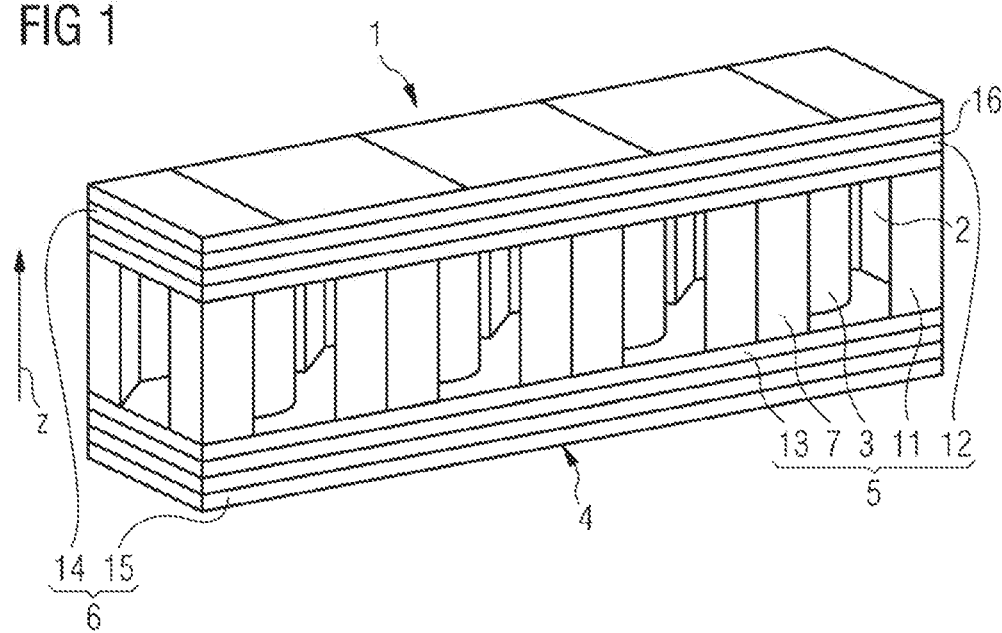
FIG. 1 shows a storage choke in a perspective view.

FIG. 1 shows a storage choke 1 for a polyphase DC/DC converter in a perspective view. The storage choke 1 comprises a plurality of coils 2. In particular, the storage choke 1 comprises four coils 2. Each of the coils 2 is formed by winding a copper wire. The windings are respectively wound around a rod-shaped core 3. An axis of the rod-shaped cores 3 defines a z direction. The rod-shaped cores 3 may, in particular, be cylindrical The storage choke 1 furthermore comprises a core 4, by means of which the coils 2 are magnetically coupled to one another. The core 4 comprises a first region 5, which comprises a first material, and a second region 6, which comprises a second material different to the first material.

Figure 2:
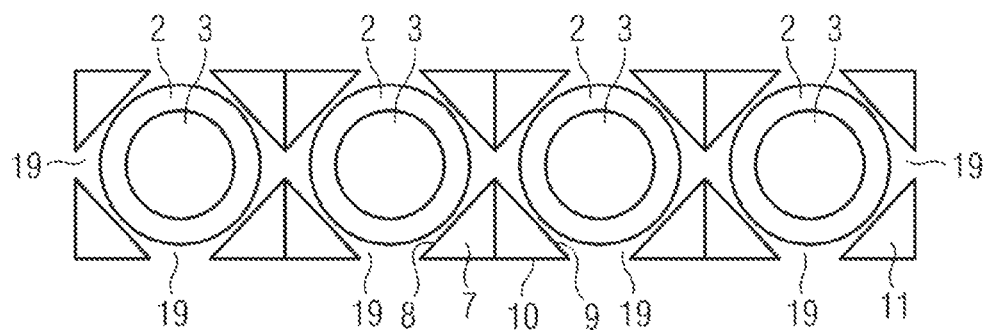
FIG. 2 shows a cross section through the storage choke.

FIG. 2 shows a cross section through the storage choke 1. A cross section is shown through a plane that is perpendicular to the axes of the rod-shaped cores 3, i.e. through a plane that is perpendicular to the z direction.

The first region 5 of the core 4 comprises the rod-shaped cores 3 mentioned above. Each of the coils 2 is wound around one of the rod-shaped cores 3. The copper windings therefore bear directly on the respective rod-shaped core 3.

The first region 5 comprises further core parts 7, which are respectively arranged between two coils 2. Each of these core parts 7 comprises a first side surface 8, which faces toward one coil 2, and a second side surface 9, which faces toward another coil 2. The core parts 7 in this case have a triangular shape in a cross section perpendicular to the z direction. Between the respective coil 2 and the first side surface 8, or the second side surface 9, a gap remains so that the coil 2 and the side surfaces 8, 9 do not touch. Furthermore, the core parts 7 comprise a third side surface 10, which faces away from the coils 2.

Furthermore, the first region 5 comprises outer core parts 11 which comprise only a single side surface that faces toward a coil 2. The outer core parts 11 also have a triangular shape in a cross section perpendicular to the z direction. The outer core parts 11 have the shape of a core part 7 divided in two in the z direction.

The first region 5 furthermore comprises a first inner plate 12. The first inner plate 12 follows on in the z direction from the rod-shaped cores 3 and the core parts 7, 11 of the first region 5. In particular, the rod-shaped cores 3 and the core parts 7, 11 directly on the first inner plate 12. No gap is arranged between the first inner plate 12 and the ends of the rod-shaped cores 3 and the core parts 7, 11.

Furthermore, the first region 5 furthermore comprises a second inner plate 12, which is arranged on the side of the rod-shaped cores 3 and of the core parts 7, 11 that faces away from the first inner plate 12. The second inner plate 13 has a similar function and the same construction as the first inner plate 12.

The inner plates 12, 13, the rod-shaped cores 3 and the core parts 7, 11 having a triangular cross section respectively consist of a first material. The first material may, for example, be compressed iron powder cores. The first material has a high saturation magnetization. For example, the first material does not exhibit magnetic saturation until magnetic flux densities of more than 1 T. The first material furthermore has a low magnetic permeability.

Furthermore, the core 4 comprises a second region 6, which consists of a second material. The second region 6 comprises a first outer plate 14 and a second outer plate 15. The first outer plate 14 is arranged on the side of the first inner plate 12 that faces away from the rod-shaped cores 3. The first outer plate 14 is arranged parallel to the first inner plate 12. The second outer plate 15 is arranged on the side of the second inner plate 13 that faces away from the rod-shaped cores 3. The second outer plate 15 is arranged parallel to the second inner plate 13. The second outer plate 15 has the same construction and the same function as the first outer plate 14.

Preferably, the second region 6 consists of the second material. The second material is a sintered material, preferably a manganese-zinc ferrite (MnZn ferrite).

A gap 16 is respectively arranged between the inner plates 12, 13 and the outer plates 14, 15. The gap 16 may be filled with air.

It will be explained below that the storage choke 1 shown in FIGS. 1 and 2 is configured in order to optimize a common-mode inductance and a differential-mode inductance so that the overall current ripple is as small as possible, in order to minimize the losses in the winding.

Figure 3:
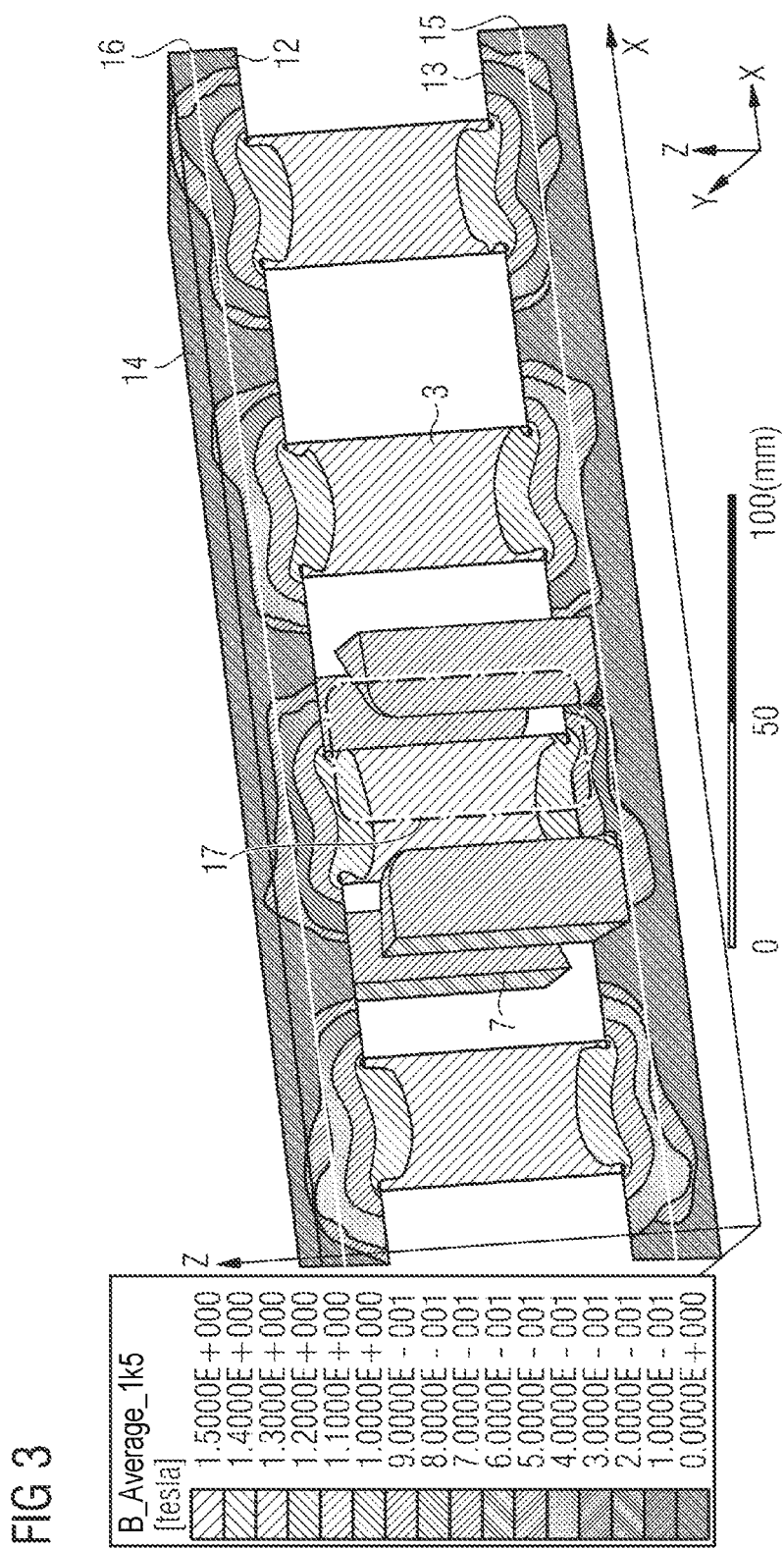
FIG. 3 shows a simulation of the magnetic flux in a core of the storage choke.
Figure 4:
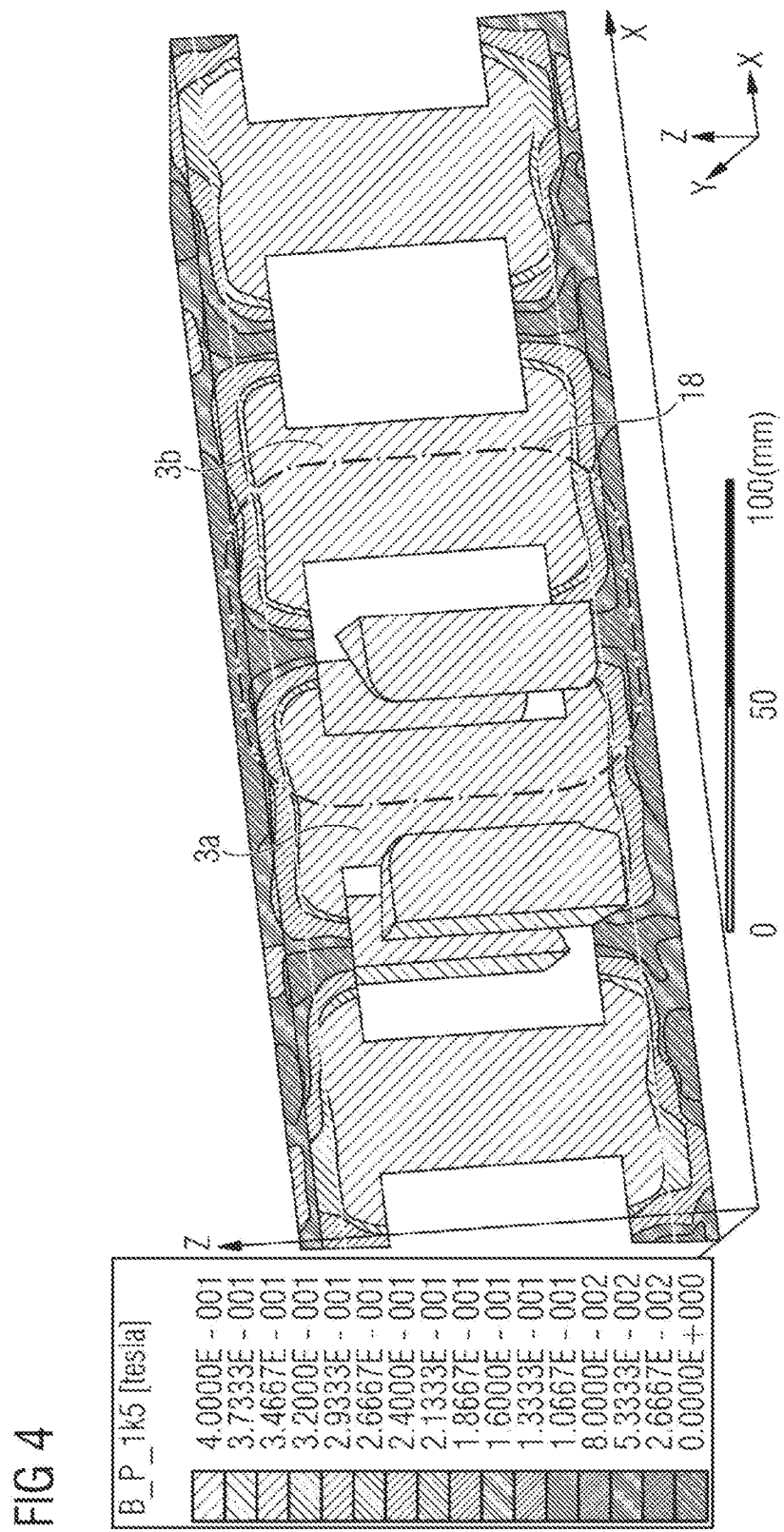
FIG. 4 shows the simulation shown in FIG. 3 with a different scale.

In this context, reference is also made to FIGS. 3 and 4, which respectively show a simulation of a magnetic flux in the core 4 when a current flows through the coils 2 of the storage choke 1. In both figures, the same current is assumed. The representations in FIGS. 3 and 4 differ by the scale used. In FIG. 3, the magnetic flux is plotted on a scale of between 0 T and 1.5 T. In FIG. 4, the magnetic flux is plotted on a more finely subdivided scale between 0 T and 0.4 T. For simpler representation, the coils 2 are not shown in FIGS. 3 and 4. Furthermore, only some of the core parts 7 are represented. In addition, the core parts 7 are only partially represented.

The storage choke 1 has both a common-mode inductance and a differential-mode inductance. The common-mode inductance is essentially determined by a magnetic flux along a path that extends along a rod-shaped core 3 in the z direction, is transmitted through the first inner plate 12 onto a core part 7 that has a side surface 8 facing toward the respective coil 2, extends through this core part 7 in the negative z direction and is coupled back into the same rod-shaped core 3 through the second inner plate 13. An example of such a common-mode part 17 is indicated in FIG. 3. The flux is preferred for the common-mode inductance as a high DC component with a low AC component.

The common-mode path 17 extends along the first region 5. The common-mode path 17 therefore extends only in the first material. Since the first material has a high magnetic saturation, a high magnetic flux may be set up along the common-mode path. The storage choke is used in a DC/DC converter. Accordingly, the majority of the magnetic flux is set up along the common-mode path. This flux has a high DC component.

For the differential-mode inductance, a magnetic flux that extends along the differential-mode paths 18 is advantageous. An example of a differential-mode path 18 is indicated in FIG. 4. It extends in the z direction along a first rod-shaped core 3a, through the first outer plate 14, in the negative z direction through a second rod-shaped core 3b and along the second outer plate 15 back to the first rod-shaped core 3a. Since this path 18 extends through the outer plates 14, 15, the material of which has a higher magnetic permeability than the material of the inner plates 12, 13, a high value is obtained for the differential-mode inductance. A high differential-mode inductance is advantageous since it leads to a low reactive power of the storage choke 1. A magnetic flux which takes place because of the coupling along the differential-mode paths 18 circulates at the input of the storage choke and leads only to reactive power. It is therefore desirable to suppress this flux by using a suitable second material.

Furthermore, only low losses occur in the second material. Accordingly, the use of two mutually different materials for the core 4 makes it possible to minimize the losses occurring in the storage choke. In particular, minimization of the losses is possible without substantially having to restrict the magnetic flux occurring along the common-mode path 17.

Furthermore, the first region 5 comprises the above-described core parts 7 having a triangular cross section and the outer core parts 11. Since these are located in the immediate vicinity of the respective coils 2, they can ensure good guiding of the magnetic fields generated by the coils 2.

The configuration of the core parts 7 with a triangular cross section makes it possible to arrange opening 19 between two core parts 7. Two neighboring core parts 7 accordingly do not touch. The coils 2 are accessible through the opening 19 between the core parts 7. This can make it possible to cool the coils 2. The configuration of the core parts 7 therefore allows guiding of the magnetic fields without impeding cooling of the storage choke 1. The same also applies for the outer core parts 11. An opening 19 is likewise formed between an outer core part 11 and the core part 7 adjacent thereto.

The common-mode inductance and the differential-mode inductance are determined by the geometrical dimensions of the first and second regions 5, 6 of the core 4. For example, the common-mode inductance and the differential-mode inductance may be altered by modifying the diameter of the rod-shaped cores 3 and/or the thicknesses of the inner and outer plates 12, 13, 14, 15. Altering the geometrical dimensions of the core parts 7, 11 having a triangular cross section may also modify the common-mode inductance and the differential-mode inductance in a desired way. Accordingly, the core 4 described here allows high design freedom with which the common-mode inductance and the differential-mode inductance may be adapted to the respective application by altering the precise geometry of the core 4.

The storage choke described here therefore represents a combination of a common-mode choke and a differential-mode choke. By this combination, the storage choke may be suitable for replacing two separate components and in this way reducing the magnetic volume.

Figure 5:
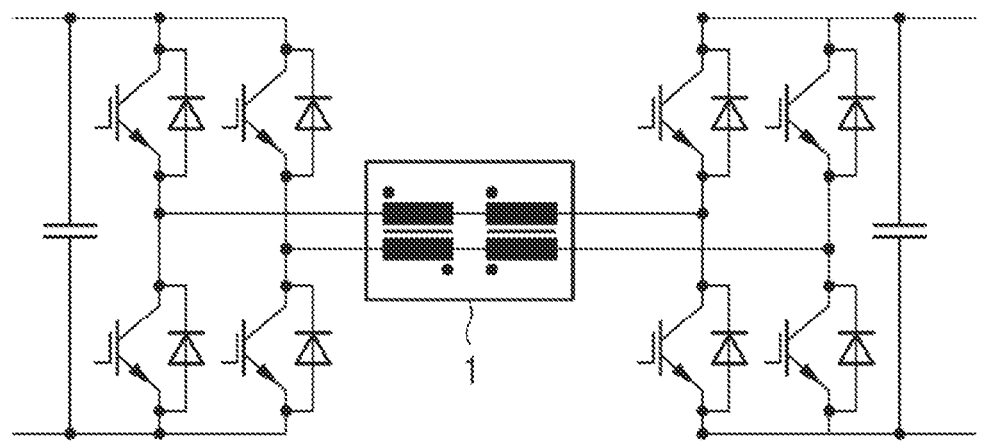
FIG. 5 is a circuit diagram of a DC/DC converter which comprises the storage choke.

FIG. 5 shows a circuit diagram of a polyphase DC/DC converter which comprises the storage choke 1 described here.

The invention claimed is:

1. A storage choke comprising:
   at least two coils; and
   a core,
   wherein the core couples the coils to one another,
   wherein the core comprises a first region comprising a first material, and a second region comprising a second material that is different from the first material, and
   wherein the first material has a higher saturation magnetization than the second material.

2. The storage choke according to claim 1, wherein a magnetic saturation of the first material does not occur until magnetic flux densities of more than one tesla are reached.

3. The storage choke according to claim 1, wherein the first material has a lower magnetic permeability than the second material.

4. The storage choke according to claim 1, wherein the first region comprises rod-shaped cores and inner plates, each coil being wound around a rod-shaped core, and wherein the rod-shaped cores are arranged between the inner plates and bear directly on the inner plates.

5. The storage choke according to claim 4, wherein the second region comprises outer plates, which are arranged on sides of the inner plates facing away from the rod-shaped cores and are arranged parallel to the inner plates.

6. The storage choke according to claim 5, wherein the inner plates and the outer plates are separated from one another by a gap.

7. The storage choke according to claim 1, wherein the first region comprises at least one core part, which is arranged between two coils in such a way that a first side surface of the at least one core part faces toward one of the two coils and a second side surface of the at least one core part faces toward another of the two coils.

8. The storage choke according to claim 7, wherein the at least one core part has a triangular cross section.

9. The storage choke according to claim 7, wherein the first region comprises a plurality of core parts, and wherein an opening is respectively arranged between the core parts.

10. The storage choke according to claim 1, wherein the first material is a compressed iron powder core.

11. The storage choke according to claim 1, wherein the second material is a sintered material.

12. The storage choke according to claim 1, wherein the second material is MnZn ferrite.

13. A polyphase DC/DC converter comprising:
    the storage choke according to claim 1.

14. A storage choke comprising:
    at least two coils; and
    a core,
    wherein the core couples the coils to one another,
    wherein the core comprises a first region comprising a first material, and a second region comprising a second material that is different from the first material, and
    wherein a magnetic saturation of the first material does not occur until magnetic flux densities of more than one tesla are reached.

15. A storage choke comprising:
    at least two coils; and
    a core,
    wherein the core couples the coils to one another,
    wherein the core comprises a first region comprising a first material, and a second region comprising a second material that is different from the first material, wherein the first region comprises rod-shaped cores and inner plates, each coil being wound around a rod-shaped core, and wherein the rod-shaped cores are arranged between the inner plates and bear directly on the inner plates.

16. The storage choke according to claim 15, wherein the second region comprises outer plates, which are arranged on sides of the inner plates facing away from the rod-shaped cores and are arranged parallel to the inner plates.

17. The storage choke according to claim 16, wherein the inner plates and the outer plates are separated from one another by a gap.

18. A storage choke comprising:
at least two coils; and
a core,
wherein the core couples the coils to one another,
wherein the core comprises a first region comprising a first material, and a second region comprising a second material that is different from the first material,
wherein the first region comprises at least one core part, which is arranged between two coils in such a way that a first side surface of the at least one core part faces toward one of the two coils and a second side surface of the at least one core part faces toward another of the two coils.

19. The storage choke according to claim 18, wherein the at least one core part has a triangular cross section.

20. The storage choke according to claim 18, wherein the first region comprises a plurality of core parts, and wherein an opening is respectively arranged between the core parts.

* * * * *